United States Patent Office 2,877,209
Patented Mar. 10, 1959

2,877,209

TERTIARY-ALKYLATED BIS-HYDROXY PHENYL PROPANE DETERIORATION RETARDERS FOR RUBBER

Jacob E. Jansen and Henry J. Kehe, Akron, Ohio, assignors to The B. F. Goodrich Company, New York, N. Y., a corporation of New York No Drawing. Application August 4, 1953
Serial No. 372,389

12 Claims. (Cl. 260—45.95)

This invention relates to alkylated bis-phenols and compositions containing the same, and relates more particularly to tertiary alkyl-substituted bis-phenols and compositions comprising the same wherein the alkylated bis-phenol functions as a deterioration retarder.

The protection of rubbery, unsaturated, organic polymers, particularly natural and the butadiene synthetic rubbers, from degradation by oxygen, light and heat has been a major objective of rubber compounders for many years. Many organic antioxidants and deterioration retarders have been proposed and employed. The most effective class of materials for this purpose has been the diarylamines and their derivatives, for example, phenyl beta naphthylamine. These amine antioxidants, while they are effective as deterioration retarders, have some disadvantages, the most objectionable being that they discolor the rubber products so that they may not be used with light colored or white rubber stocks. Phenols and alkyl phenols have been proposed as non-discoloring antioxidants in place of the diarylamines in light colored rubber stocks and have been successful to some extent in decreasing the discloration of the rubber compound as it ages, but these compounds do not protect the rubber materials from the other deleterious effects of oxygen and heat as effectively as the diarylamines.

We have now discovered that certain alkylated bis-phenols are highly effective deterioration retarders, being more efficient than the known phenolic antioxidants and as good as the widely used diarylamine antioxidants. In addition they possess excellent non-discoloring and non-staining properties when used in rubber compositions. Accordingly, this invention provides alkylated bis-phenolic deterioration retarders containing from 1 to 4 tertiary alkyl groups on the phenyl nuclei, and compositions of the antioxidant and the rubber wherein the alkylated bis-phenols function effectively as non-discoloring, non-staining deterioration retarders. These alkylated bis-phenols are effective in raw (crude) and vulcanized rubber compositions.

The alkylated bis-phenols most effective for the purposes of this invention are reaction products of certain tertiary olefins and bis-phenols whereby 1 to 4 tertiary olefin molecules are added to the bis-phenol in a position ortho to the hydroxyl groups. The tertiary alkyl-substituted bis-phenols of this invention are prepared, for example, by condensing the tertiary olefin with the bis-phenol in the presence of a condensation catalyst under proper conditions so that the resulting reaction mixture is composed essentially of the alkylated product. The reaction product will naturally contain a mixture of mono-, di- and higher tertiary alkylated bis-phenols which may be fractionated into the separate components. The reaction product is particularly useful in the practice of this invention.

The tertiary olefin employed in preparing the alkylated bis-phenol may contain from 4 to 8 carbon atoms of which the following are examples: isobutylene, isoamylene, 2-methyl pentene-1, 2-ethyl propene-1, 2-ethyl pentene-1, 2-methyl hexene-1, diisobutylene and the like as well as mixtures of these olefins. The bis-phenol preferably reacted with the tertiary olefin is 2,2-bis(4-hydroxyphenyl)propane. Other useful bis-phenols include 2,2-bis(4-hydroxyphenyl)butane, 3,3-bis(4-hydroxyphenyl)pentane, 2,2-bis(4-hydroxyphenyl)pentane, 2,2-bis(4-hydroxyphenyl)hexane, 2,2 - bis(4-hydroxyphenyl)-4-methyl pentane, 3,3-bis(4-hydroxyphenyl)hexane, 3,3-bis(4-hydroxyphenyl) heptane, 3,3-bis(4-hydroxyphenyl)-4-methyl hexane, 3,3-bis(4-hydroxyphenyl)-5-methyl hexane, 3,3-bis(4-hydroxyphenyl)-3,4-dimethyl pentane and the like. Mixtures of the tertiary olefins may be employed. The reactants preferably employed are isobutylene and 2,2-bis(4-hydroxyphenyl) propane.

In preparing the compositions of this invention, the tertiary alkylated bis-phenol is obtained by reacting, for example, isobutylene with 2,2-bis(4-hydroxyphenyl)propane in the presence of an acidic condensation catalyst in an organic solvent under the influence of heat. The reaction product after separation from the solvent is a mixture of tertiary alkylated bis-phenols consisting of the mono-, di- and higher tertiary alkylated bis-phenols. The mono- and di-substituted bis-phenols are effective as non-staining, non-discoloring antioxidants. It is preferred that the major component of the reaction mixture employed in rubber compositions be higher substituted tertiary alkyl bis-phenols. The reaction mixture may be employed as such or the various tertiary alkyl-substituted bis-phenols separated as by fractional distillation and employed as the fractions.

The condensation reaction is preferably conducted in the presence of an organic solvent inert to the reactants. Such hydrocarbon solvents as hexane, heptane, benzene, toluene and the like are satisfactory. Other usual solvents such as acetic acid may be employed. The reaction is conducted at a temperature preferably above 50° C. A reaction temperature of about 65 to 85° C. results in very satisfactory reaction rates, and temperatures up to the boiling points of the solvents may be employed while pressure reactions may be conducted with lower boiling solvents.

The catalysts employed are acidic condensation catalysts such as sulfuric acid, para-toluene sulfonic acid, boron trifluoride, acid activated clays and the like. Particularly useful are combinations such as sulfuric acid and finely-divided acid activated clays. Such a combination is useful with low purity reactants. The use of an acid activated clay is particularly advantageous since the reaction mixture has only to be filtered and the solvent removed to be ready for use. In addition the acid activated clay removes many colored and otherwise undesirable reaction by-products. The acid activated clays preferred are those whose major component is aluminum silicate in an amount preferably greater than 50 percent. The clay is preferably of such a particle size that greater than 90 percent of the particles will pass a 325 mesh screen and have a particle size less than 0.05 millimeter. The acid activated clay preferably has an acid reaction or is acid treated with a pH between 1 and 6. The amount of clay employed may be from 0.5 to 10 percent or more. The amount of other acid catalyst required for the condensation reaction may be varied quite widely but is generally from 0.1 to about 5.0 percent by weight of the bis-phenol reactant employed. The amount of catalyst preferred is generally from about 0.5 to 10 percent.

The amounts of the other reactants employed are somewhat critical. In order to obtain a reaction mixture having the greatest activity as an antioxidant, it is necessary to employ about 4 mols of the tertiary olefin to about 1 mol of the bis-phenol. This 4:1 ratio of reactants, under optimum reaction conditions, results in high yield of the higher tertiary alkylated bis-phenol; and the tertiary olefin probably adds to the bis-phenol at positions ortho to the hydroxy groups. Thus, under proper conditions 4 mols of isobutylene react with 1 mol of 2,2-bis(4-hydroxyphenyl)-propane to form a mixture of products, and the following compounds may be obtained as major components of the reaction mixture:

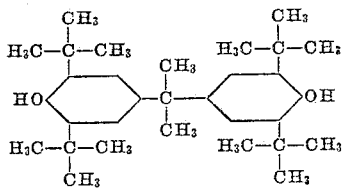

the di-substituted reaction product

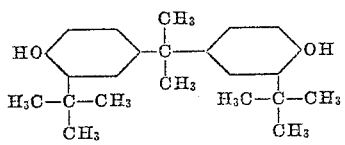

and the mono-substituted reaction products

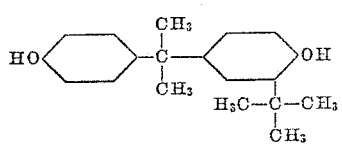

These products are obtained by fractional distillation of reaction mixtures and recrystallization from benzene. Lesser amounts of higher tertiary butylated product and larger amounts of mono-, di- and substituted products are obtained with lower concentrations of the tertiary olefin, less than 4 mols, and under less favorable reaction conditions.

The reaction product is ordinarily a yellow, relatively viscous oil which has a tendency to crystallize during extended storage periods. This tendency may be overcome by including in the reaction mixture a small amount of an aryl-substituted alkenyl hydrocarbon having the general formula

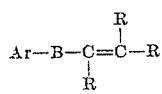

wherein Ar is an aryl hydrocarbon, B is an alkylidene radical containing from 0 to 5 carbon atoms and R is a hydrogen or alkyl radical. Specific aralkenyl compounds which are suitable for this purpose include styrene, alpha-methyl styrene, para-methyl styrene, para-methyl alpha methyl styrene, ethyl styrene, allyl benzene, allyl naphthalene, vinyl naphthalene and the like. Preferred amounts are about 5 to 25 parts of styrene to 100 parts of isobutylene by weight. Expressed in molar ratios, the preferred ratio of isobutylene to styrene ranges from about 8 to 40 mols of isobutylene to 1 mol of styrene. Another useful method to overcome this crystallization tendency is to use an excess of the tertiary olefin such as isobutylene so that some of the isobutylene forms tri-isobutylene which acts as an anti-crystallization substance.

The condensation reaction may be carried out in an autoclave equipped with a stirrer, heater, a reflux condenser and inlet tubes for introducing gaseous tertiary olefins at the bottom of the reactor. The reaction is preferably conducted under an inert atmosphere such as nitrogen. A solvent such as benzene is placed in the reactor and the bis-phenol and acidic catalyst added thereto. The mixture is stirred vigorously while heating to a temperature of about 70° C. under a nitrogen atmosphere. The tertiary olefin is preferably added over about a five hour period, and if added at too rapid a rate, dimer and trimer may be formed. If an acid activated clay is employed as the catalyst, the reaction mixture is filtered at the end of the reaction and the solvent removed therefrom. If sulfuric acid is employed as a catalyst, it must be neutralized with an alkali such as sodium hydroxide at the end of the reaction, the product washed with water and the two layers which form then separated. The benzene is then stripped from the reaction mixture under reduced pressure. The remaining reaction product may be used as is or further purified by fractional distillation to separate the various tertiary alkyl-substituted bis-phenols.

The reaction products or fractions thereof are employed as non-discoloring, non-staining deterioration retarders for unsaturated, rubbery, organic, polymeric materials which include all natural and synthetic, unsaturated, rubbery, polymeric materials, both vulcanized and unvulcanized, such as Butyl rubber, which is an unsaturated rubbery copolymer of the monoolefin isobutylene and the conjugated diolefin butadiene, and especially for those which may be considered to be predominantly unsaturated rubbery polymers of the conjugated diolefinic type. The term "unsaturated rubbery diolefinic polymer" is employed in the specification and claims of this application to include the conjugated diolefinic polymers including (a) polymers of butadiene-1,3, isoprene, dimethyl butadiene, chlorobutadiene, fluorobutadiene, cyanobutadiene and the like as well as (b) copolymers of these conjugated diolefins with each other and also (c) copolymers of these conjugated diolefins with other unsaturated compounds copolymerizable therewith including monoolefins such as the vinylidene compounds represented by the styrenes, acrylonitriles, acrylic and methacrylic acid and their esters, isobutylene, vinylidene chloride, vinyl pyridene, vinyl esters, vinyl alkyl esters and the like. The method of preparation of the above enumerated unsaturated rubbery diolefinic polymers is immaterial and the alkylated bis-phenols of this invention may be added to a solution, latex or dry polymer product as is well-known to those skilled in the art. The alkylated bis-phenol may be added as is or in a solution, emulsion, dispersion or the like.

The amount of reaction product employed as a deterioration retarder in an unsaturated, rubbery, diolefinic polymer may be from about 0.1 to about 10 weight percent based on the amount of polymer, but to obtain the maximum value of the reaction product as a non-discoloring, non-staining deterioration retarder, an amount from about 0.5 to 5 weight percent will generally give adequate protection.

The tertiary alkyl-substituted bis-phenols can be readily mixed with the unsaturated rubbery diolefinic polymers at some stage subsequent to polymerization and prior to drying. They are also readily mixed with unsaturated rubbery diolefinic polymers at the same time and in the same manner that vulcanizing or curing agents and other compounding ingredients are added. This is the preferred method of incorporating these deterioration retarders into natural crude rubber and results in the antioxidant becoming uniformly dispersed throughout the rubber composition. However, in case of synthetic unsaturated rubbery diolefinic polymers such as copolymers of butadiene with styrene or acrylonitrile which are ordinarily prepared by copolymerization in an aqueous medium, it is most convenient to add the alkylated bis-phenol compounds in an aqueous dispersion or emulsion to the latex as it comes from the polymerization equipment. This has the added advantage that when the polymer is recovered from the latex by coagulation, the deterioration retarder is already uniformly incorporated throughout the mass of the unsaturated rubbery diolefinic polymer. The polymer is thus protected from the time it is made through the drying stage and storage period, and deterioration retarder does not have to be added during the compounding.

The preparation of the alkylated bis-phenols and compositions of the same in unsaturated rubbery diolefinic polymers are more fully set forth in the following examples which are intended to be illustrative only since modifications and variations thereof will be apparent to those skilled in the art.

EXAMPLE I

A reaction vessel is equipped with a thermometer, agitator, reflux condenser and inlet tube for introducing gaseous isobutylene at the bottom of the vessel. 46 grams of 2,2-bis(4-hydroxyphenyl)propane, which has been washed in benzene, is suspended in 350 ml. of benzene and 2.3 grams of 97% sulfuric acid added thereto. This mixture is heated to about 70° C. and while vigorously agitating, about 40 grams of isobutylene is introduced into the mixture over a 5.5 hour period while maintaining the reaction mixture at 70° C. A weight increase of about 38 grams is obtained. The benzene solution of the reaction product is washed with 200 ml. of 15 percent sodium hydroxide solution followed by two water washes to remove the sulfuric acid catalyst. The benzene is then removed by distillation leaving a residue of about 81 grams of reaction product which is a yellow, free-flowing syrup. The product weight shows that approximately 3 mols of isobutylene reacts under these conditions with 1 mol of the bis-phenol. This reaction mixture is composed of the mono-, di-, higher tertiary butylated bis-phenol.

This reaction mixture is tested for the degree of deterioration retardation by compounding with natural rubber in the following recipe:

| Compounding recipe: | Parts by weight |
|---|---|
| Natural rubber | 100.0 |
| Easy processing channel black | 50.0 |
| Zinc oxide | 5.0 |
| Stearic acid | 3.0 |
| Sulfur | 3.0 |
| Benzothiazyl disulfide | 1.0 |

Three compounded stocks are prepared (1) a blank without deterioration retarder (stabilizer or antioxidant), (2) a control stock with one part of phenyl beta naphthylamine per hundred of rubber (P. H. R.), and (3) a compound containing one part of the alkylated bis-phenol reaction product of this example per hundred of rubber (P. H. R.). The compounded stocks are cured in a steam press at 280° F. for 40, 60 and 80 minutes. Test dumbbell strips are cut from the vulcanized stock and aged in air in open test tubes for 24 and 48 hours at 212° F. Stress strain results are obtained on both the aged and unaged samples. This test is fully described in ASTM test method D865-48T. Other aged strips are subjected to flexing tests in the De Mattia flexing machine where the test strips are flexed and the number of flexures recorded. The flex test is carried out until crack growth has reached a rating of 7, where a rating of 0 represents no cracking and a rating of 10 represents complete break. The ratings are determined by comparison of the crack growth with established standards for each rating. The following test results are obtained.

The reaction product is tested for staining and discoloring tendencies by incorporating the product in a standard tire white wall composition and curing in a steam press. The recipe employed is:

| Compounding recipe: | Parts by weight |
|---|---|
| Natural rubber | 100.0 |
| Zinc oxide | 85.0 |
| Titanium dioxide | 15.0 |
| Ultramarine blue | 0.2 |
| Stearic acid | 1.0 |
| Heptene base | 0.3 |
| Sulfur | 3.0 |
| Deterioration retarder | 1.0 |

A blank without deterioration retarder and a control stock containing phenyl beta naphthylamine as the antioxidant are also compounded for comparison purposes. The cured stocks are exposed to a standard RS sunlamp at a distance of 8 inches for 24 hours to determine discoloration in the stock. In the data table given below, the larger the numerical value of the rating, the greater the discoloration.

*Discoloration*

| | |
|---|---|
| Blank | 2½ |
| Reaction product—Example I | 2½ |
| Phenyl beta naphthylamine-control | 8 |

The reaction product of this example is tested for staining by taking cured test pieces of the white vulcanizates obtained as described above and placing them between white lacquered and white enameled refrigerator panels for 96 hours at 80° C. at a contact pressure of 1 pound per square inch. In the data table given below, the larger the numerical value of the fractional rating, the greater the stain.

*Staining*

| | |
|---|---|
| Blank | ⅔ |
| Reaction product—Example I | ⅛ |
| Phenyl beta naphthylamine-control | ⅘ |

The smaller fractional rating of staining and discoloration in the stock containing the reaction product of Example I clearly shows the superiority of the alkylated bis-phenols of this invention over the standard control antioxidant, phenyl beta naphthylamine.

Example II

A reaction vessel equipped as described in Example I is charged with 114 grams of 2,2-(4-hydroxyphenyl)propane which has a melting point of about 151 to 155° C., 350 ml. of benzene, and 10 grams of a finely-divided acid activated clay having a pH of 3. This mixture is heated to about 70° C. with vigorous stirring and isobutylene is introduced into the reaction mixture at a slow rate while maintaining the reaction mixture at 70° C. After a period of 4.5 hours a weight increase in the reaction mixture of 124 grams is noted. The reaction

| | Time of Cure, Minutes | No Antioxidant | | | 1 PHR PBNA | | | 1 PHR Reaction Product | | |
|---|---|---|---|---|---|---|---|---|---|---|
| | | 300% Modulus, p. s. i. | Tensile Strength, p. s. i. | Elongation, percent | 300% Modulus, p. s. i. | Tensile Strength, p. s. i. | Elongation, percent | 300% Modulus, p. s. i. | Tensile Strength, p. s. i. | Elongation, percent |
| Original Vulcanizate | 40 | 1,380 | 4,000 | 580 | 1,475 | 4,075 | 585 | 1,325 | 3,860 | 580 |
| | 60 | 1,775 | 4,100 | 520 | 1,700 | 4,025 | 550 | 1,600 | 4,000 | 555 |
| | 80 | 1,880 | 4,090 | 530 | 1,760 | 3,975 | 540 | 1,775 | 4,050 | 520 |
| Aged 24 hours at 212° F | 40 | 2,100 | 3,250 | 450 | 1,975 | 3,600 | 480 | 1,925 | 3,825 | 530 |
| | 60 | 2,200 | 2,825 | 370 | 2,300 | 3,580 | 450 | 2,140 | 3,625 | 480 |
| | 80 | 2,100 | 2,600 | 350 | 2,300 | 3,325 | 410 | 2,350 | 3,640 | 460 |
| Aged 48 hours at 212° C | 40 | | 1,650 | 210 | | 2,450 | 280 | 2,450 | 2,740 | 340 |
| | 60 | | 1,650 | 220 | 2,450 | 2,750 | 340 | 2,410 | 2,925 | 360 |
| | 80 | | 1,350 | 220 | | 2,260 | 290 | 2,480 | 2,800 | 340 |
| De Mattia Flexures to Rating of 10 | | | 58,000 | | | 198,000 | | | 134,000 | |

The deterioration retarding properties of the reaction mixture of this invention are clearly equal to those of phenyl beta naphthylamine.

mixture is filtered to remove the clay catalyst, and the benzene is distilled from the filtrate to give 232 grams of a yellow viscous reaction product. The product weight shows that approximately 4 mols of isobutylene react with one mol of the bis-phenol under these reaction conditions. This mixture contains a small amount of triisobutylene, a major amount of the tetra-substituted tertiary butyl bis-phenol which may be separated from the mixture and smaller amounts of di- and tri-substituted products. When this reaction product is tested in rubber in the same manner as that described in Example I, similar excellent results are obtained which show this reaction product to be a superior non-discoloring, non-staining deterioration retarder.

*Example III*

A reaction vessel equipped as described in Example I is charged with 114 grams of 2,2-bis(4-hydroxyphenyl)-propane which has been washed in benzene, 350 ml. of benzene and 10 grams of a finely-divided acid activated clay which has a pH of about 3. This mixture is vigorously stirred while heating at about 70° C. and nitrogen is introduced at a slow rate. While maintaining the temperature at 70° C., 21 grams of styrene is added over a period of thirty minutes; then 96 grams of isobutylene is then added over a period of three hours. The weight increase of the reaction mixture is about 117 grams. The hot reaction mixture is filtered. Benzene is distilled from the product under reduced pressure, about 15 mm. The resulting reaction product is a yellow viscous material which weighs 227 grams. When this product is tested in rubber as described in Example I, it is found to be an excellent non-discoloring, non-staining deterioration retarder.

When alkylated bis-phenols of the type described are prepared using other catalysts such as sulfuric acid, paratoluene sulfonic acid, or boron trifluoride, similar excellent results are obtained. When other tertiary olefins such as diisobutylene are employed, useful products are also obtained. Bis-phenols of the type described other than the ones employed in the examples given above likewise may be utilized to obtain useful non-discoloring, non-staining deterioration retarders. When these products are employed in rubber compounds and with other types of unsaturated, rubbery, organic polymers that are well-known to those skilled in the art, similar excellent results are obtained in the protection of both unvulcanized and vulcanized compositions. Products so stabilized are extremely useful in applications where non-staining, non-discoloring stocks are employed such as refrigerator gaskets, white sidewall tires, light colored gloves, bathing caps and similar articles.

Although this invention has been illustrated by means of specific examples, we do not thereby intend or desire to limit the invention solely thereto, for as heretofore stated, the precise proportions and types of materials used may be valid, and obviously equivalent materials, as defined in the specification, may be employed, if desired, without departing from the spirit and scope of the invention as defined in the appended claims.

We claim:

1. As a new composition of matter, the reaction product of 2,2-bis(4-hydroxyphenyl)propane and a tertiary olefin selected from the class consisting of isobutylene and diisobutylene, the reaction being carried out in an organic solvent inert to the reactants and in the presence of an acidic condensation agent and at a temperature ranging from about 50° C. up to the boiling point of the inert organic solvent, and in which about 1 mol of the 2,2-bis(4-hydroxyphenyl)propane and about 4 mols of the tertiary olefin are brought into reactive contact.

2. As a new composition of matter, the reaction product of 2,2-bis(4-hydroxyphenyl)propane and isobutylene, the reaction being carried out in an organic solvent inert to the reactants and in the presence of an acidic condensation agent and at a temperature ranging from about 50° C. up to the boiling point of the inert organic solvent, and in which about 1 mol of the 2,2-bis(4-hydroxyphenyl) propane and about 4 mols of the isobutylene are brought into reactive contact.

3. As a new composition of matter, the reaction product of 2,2-(4-hydroxyphenyl)propane and diisobutylene, the reaction being carried out in an organic solvent inert to the reactants and in the presence of an acidic condensation agent and at a temperature ranging from about 50° C. up to the boiling point of the inert organic solvent, and in which about 1 mol of the 2,2-bis(4-hydroxyphenyl)propane and about 4 mols of the diisobutylene are brought into reactive contact.

4. As a new composition of matter, a 2,2-bis(3,5-t-alkyl-4-hydroxyphenyl)propane, in which the t-alkyl group is selected from the class consisting of isobutyl and diisobutyl groups.

5. As a new composition of matter, 2,2-bis(3,5-t-butyl-4-hydroxyphenyl)propane.

6. As a new composition of matter, 2,2-bis(3,5-t-diisobutyl-4-hydroxyphenyl)propane.

7. A rubbery composition comprising an unsaturated rubbery diolefinic polymer selected from the class consisting of a polymer of a conjugated diolefin and a copolymer of a conjugated diolefin with a monoolefin, through which unsaturated diolefinic polymer is dispersed from about 0.1 to about 10 weight percent based on the weight of the unsaturated rubbery diolefinic polymer of a deterioration retarder selected from the class consisting of 2,2-bis(3,5-t-butyl-4-hydroxyphenyl)propane and 2,2-bis(3,5-t-diisobutyl-4-hydroxyphenyl)propane.

8. The rubbery composition defined in claim 7 in which the said deterioration retarder comprises 2,2-bis(3,5-t-butyl-4-hydroxyphenyl)propane.

9. The rubbery composition defined in claim 7 in which the said deterioration retarder is 2,2-bis(3,5-t-diisobutyl-4-hydroxyphenyl)propane.

10. A sulfur-vulcanized composition comprising an unsaturated rubbery diolefinic polymer selected from the class consisting of a polymer of a conjugated diolefin and a copolymer of a conjugated diolefin with a monoolefin, through which said sulfur-vulcanized composition is dispersed from about 0.1 to about 10 weight percent based on the weight of the unsaturated rubbery diolefinic polymer of a deterioration retarder selected from the class consisting of 2,2-bis(3,5-t-butyl-4-hydroxyphenyl)propane and 2,2-bis(3,5-t-diisobutyl-4-hydroxyphenyl)propane.

11. The sulfur-vulcanized composition defined in claim 10 in which the said deterioration retarder is 2,2-bis(3,5-t-butyl-4-hydroxyphenyl)propane.

12. The sulfur-vulcanized composition defined in claim 10 in which the said deterioration retarder is 2,2-bis(3,5-t-diisobutyl-4-hydroxyphenyl)propane.

References Cited in the file of this patent

UNITED STATES PATENTS

| | | |
|---|---|---|
| 2,628,212 | Young | Feb. 10, 1953 |
| 2,670,340 | Kehe | Feb. 23, 1954 |
| 2,688,597 | Pott et al. | Sept. 7, 1954 |
| 2,731,442 | Forman | Jan. 17, 1956 |
| 2,734,088 | Knowles et al. | Feb. 7, 1956 |
| 2,745,726 | Young et al. | May 15, 1956 |

UNITED STATES PATENT OFFICE
CERTIFICATE OF CORRECTION

Patent No. 2,877,209                                                            March 10, 1959

Jacob E. Jansen et al.

It is hereby certified that error appears in the printed specification of the above numbered patent requiring correction and that the said Letters Patent should read as corrected below.

Column 6, line 48 and column 8, line 11, for "2,2-(4-hydroxyphenyl)", each occurrence, read -- 2,2-bis(4-hydroxyphenyl) --.

Signed and sealed this 21st day of July 1959.

(SEAL)
Attest:

KARL H. AXLINE                                                   ROBERT C. WATSON
Attesting Officer                                            Commissioner of Patents